March 24, 1942. M. BONOTTO 2,277,361
METHOD AND APPARATUS FOR DIRECT-STEAM TREATMENT
OF EXTRACTED SOLID MATERIALS
Filed Sept. 15, 1938 2 Sheets-Sheet 1
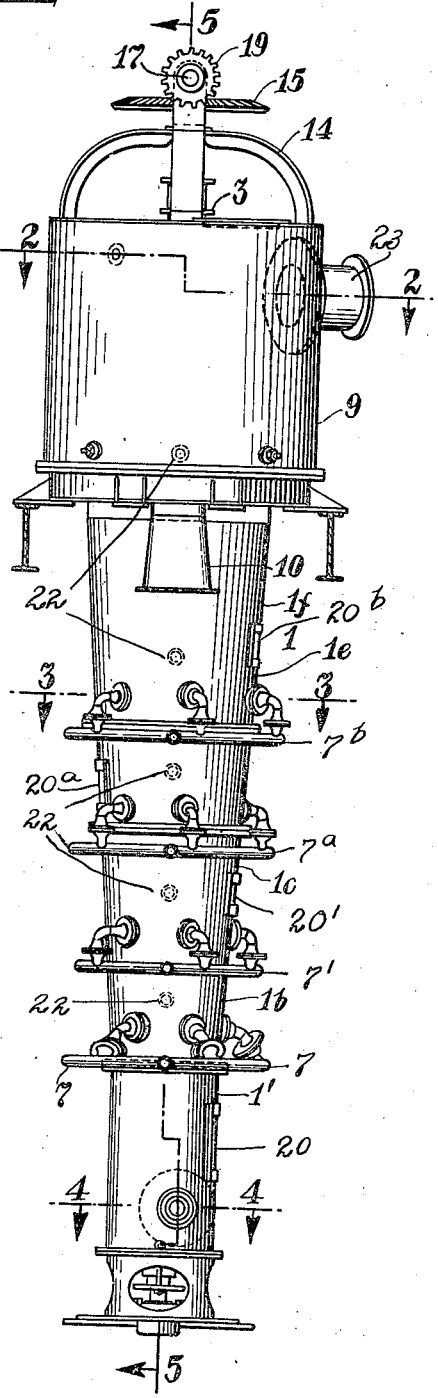
INVENTOR
MICHELE BONOTTO
BY
ATTORNEY March 24, 1942.　　　M. BONOTTO　　　2,277,361
METHOD AND APPARATUS FOR DIRECT-STEAM TREATMENT
OF EXTRACTED SOLID MATERIALS
Filed Sept. 15, 1938　　2 Sheets-Sheet 2
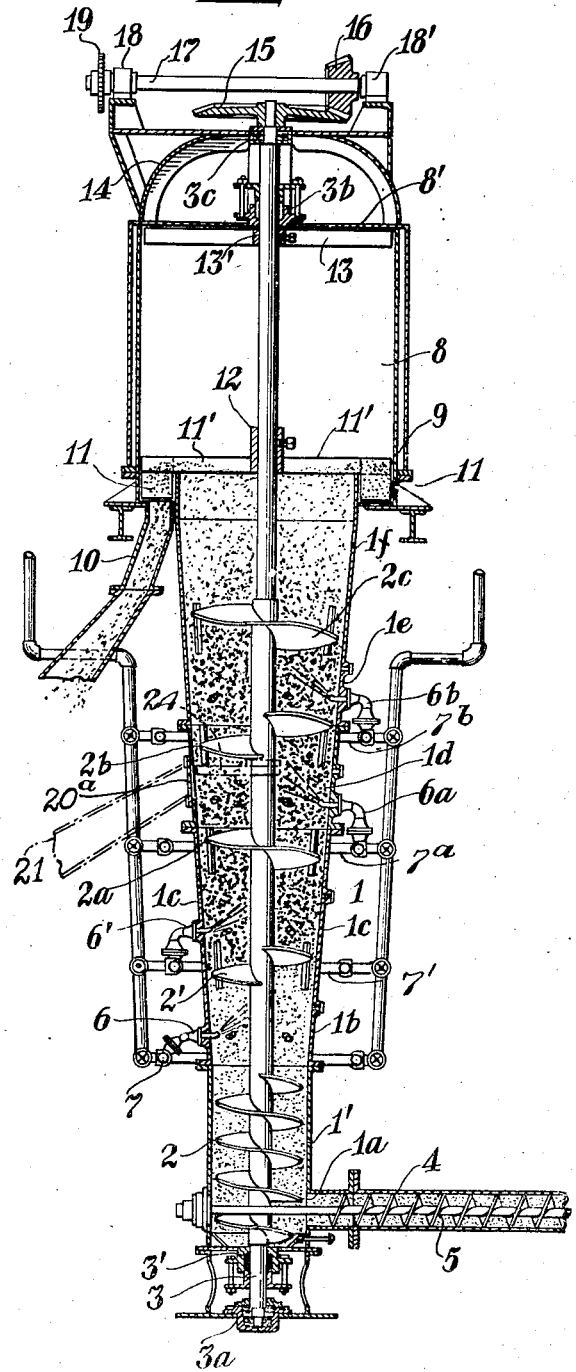
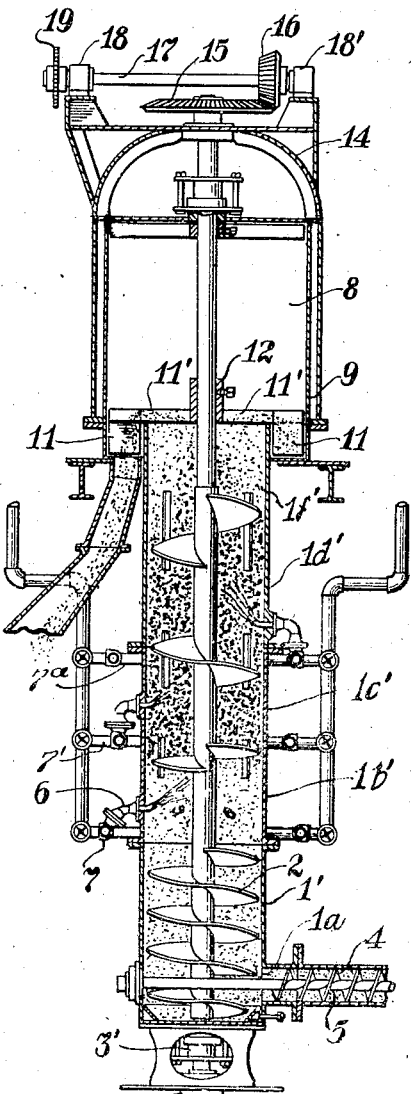
INVENTOR
MICHELE BONOTTO
BY
ATTORNEY Patented Mar. 24, 1942

2,277,361

UNITED STATES PATENT OFFICE 2,277,361

METHOD AND APPARATUS FOR DIRECT-STEAM TREATMENT OF EXTRACTED SOLID MATERIALS

Michele Bonotto, Evansville, Ind., assignor to Extractol Process, Ltd., Wilmington, Del., a corporation of Delaware Application September 15, 1938, Serial No. 230,056

9 Claims. (Cl. 34—37)

This invention relates to improvements in method and apparatus for direct-steam treatment of extracted solid materials and methods of treating such material.

Heretofore, apparatus for direct steam treatment of solid materials either embodied long steam-jacketed conveyors disposed in horizontal or inclined position which conveyed the material in one direction and through which steam in counter-current expanded at the atmospheric pressure of the conveyor is passed, or a vertical steam-jacketed tank has been employed through which the material has been raked or swept around by rakes or agitators over a series of successive compartment partitions or plates and through staggered apertures therein to fall by gravity down to the next compartment and has during such movements been subjected to a current of steam moving in counter-current and expanded at the atmospheric pressure of the tank. All such apparatus is very bulky, the conveyors of average capacity being about ninety feet long and twenty inches inside diameter with a mixing screw revolving at about sixty revolutions per minute and the duration of the operation is from ten to fourteen minutes. In both types of apparatus hereinabove specified, a large quantity of dust is formed because the moving parts pulverize a part of the solid material being treated, and in some cases large and elaborate dust collectors must be provided in order to catch the dust in order to prevent the same from passing into and reducing the efficiency of the condenser. Furthermore, in such prior art apparatus a portion of the steam is condensed and mixes with pulverized solid material or dust to form a paste which clings to the surfaces of the tank as well as to the moving parts of the apparatus, thus greatly reducing the efficiency of the apparatus and requiring frequent cleaning.

One of the objects of this invention is to provide an apparatus which will not only greatly economize space, being relatively small and compact in relation to all such apparatus heretofore used, but will greatly reduce the time consumed in treating such material to meet market requirements.

Another object of my invention is to minimize pulverization in the steam-treating tank of solid material and consequently to avoid the necessity for the use in connection with the apparatus of elaborate dust collectors, and furthermore, to provide an apparatus which will be self-cleansing and in which the formation of a sticky paste from condensed steam and dust or pulverized material will be eliminated, and the walls of the apparatus will be automatically cleaned during use and kept free from clinging sticky pastes.

Another object of my invention is to provide, in an apparatus for continuously treating such material with direct steam, a section in which the material will be subjected to a continuous relatively-loose gravity packing while at the same time such gravity-packed material will be subjected to the heating, drying or wetting and/or solvent-entraining actions of direct steam, whereby, due to such loose packing and the application of steam, an increased interchange of heat between the steam and material within a given time period and in a relatively small space may be effected.

Another object of my invention is to provide an apparatus for the purpose specified in which a column of solid material will be moved vertically in an upward direction through an unobstructed gravity-packing section by a conveyor disposed below such section and a current of steam will be simultaneously passed in the same direction through such gravity-packed material.

Another object of my invention is to provide an apparatus in which the loosely packed solid extracted material in a packing section extending in an upward direction will be subjected to steam blown directly through a series of jets within such section while the material is in its loosely packed condition so that the steam being blown while passing through the loosely packed material will still be under pressure due to such packing and the condensing temperature in the packing section will thus be higher than is the case with prior-art apparatus where steam is expanded at the atmospheric pressure of the conveyor or tank.

Another object of my invention is to provide a tank or column having a plurality of packing sections in which the capacity of the successive sections will be increased progressively in an upward direction to reduce the density and compensate for the increase in length of the upward path that steam admitted to a lower section is compelled to follow from its inlet to its outlet.

Another object of my invention is to provide a packing section or sections comprising inverted frustro-conic section or sections so that the wall of the tank diverges outwardly as it extends upwardly for the purpose of compensating, as aforesaid, for the increased path that the treating steam fed in at the lower end of such divergent section is compelled to follow by progressively reducing the degree of gravity packing, and my preferred form of tank has a shallow conic pitch which will be sufficient to provide increased capacity in the packing section or sections as the tank increased in height and to avoid excessive packing by an upwardly-forcing conveyor screw acting only against gravity or the weight of the material.

Still another object of my invention is, in an apparatus of the type specified, to provide a tank embodying, in combination with an upper steam-treating section provided with steam inlets and outlets and having upwardly-increasing capacity or outwardly-divergent walls, of a cylindrical lower conveyor section adapted to contain a more compact body of material so as to prevent steam, admitted to the treating sections, from blowing downwardly and to cause the same to follow its proper upward path from the inlet to the outlet.

Another object of my invention is to provide an apparatus of the type above specified which will embody above the lower conveyor screw, a plurality or series of packing sections provided with walls continuously diverging outwardly as the sections extend upwardly and having a plurality or series of conveyor screws of increasing diameters and preferably I provide on a single conveyor shaft a plurality or series of spaced or interrupted conveyor-screw flights of progressively increasing diameters as they extend upwardly so that the tank or column sections between such interrupted flights will comprise packing sections for the purpose above specified.

Still another object of my invention is to provide apparatus of the type specified in which steam will be blown into a tank of the type specified, through a series of nozzles connected to steam manifolds located at a plurality of different levels and within packing sections or spaces provided between interrupted flights of a conveyor screw.

Another object of my invention is to produce apparatus of the character described which may be employed for the purpose of successively subjecting extracted material to the heating and drying action of a series of jets of superheated steam located at different levels and/or for the purpose of entraining with said steam the last traces of solvent with which such material may be impregnated.

Another object of my invention is to produce an apparatus which may be used to supply to such material an adjusted amount of moisture such as may be required by market conditions, and to this end to supply, at one level during such drying treatment, a wet steam for the purpose of providing the material with the necessary amount of moisture while at another level a superheated steam may be blown, thus enabling the adjustment of the necessary amount of moisture as well as the necessary degree of drying.

With these and other objects in view, the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawings, in which:

Fig. 1 is a view in side elevation of an apparatus embodying my invention;

Fig. 2 is a horizontal section on the line 2—2 of Fig. 1, looking in the direction of the arrows;

Fig. 3 is a horizontal section on the line 3—3 of Fig. 1, looking in the direction of the arrows;

Fig. 4 is a horizontal section on the line 4—4 of Fig. 1, looking in the direction of the arrows;

Fig. 5 is a vertical section substantially on the line 5—5 of Fig. 1, looking in the direction of the arrows;

Fig. 6 is a vertical section of a modified form of apparatus with a shorter path of travel of the material.

Referring now to these drawings and particularly to Figs. 1 to 5 which illustrate a preferred embodiment of my invention, I indicates a vertically-disposed tank having between its ends a plurality of direct-steam treating sections $1^b$, $1^c$, $1^d$ and $1^e$ adapted to contain and be filled with solid extracted material and into and through which steam is admitted under suitable pressure, and provided, at the bottom portion thereof, with a cylindrical section $1'$ also adapted to contain a body of material of sufficient length and density to prevent downward blowing therethrough of the steam admitted to the said treating sections. Adjacent to the bottom of the tank a feed opening $1^a$ is provided through which solid material is fed from a conduit 4 containing a conveyor-screw 5 and in which may be provided a plug of material adjacent to the feed opening $1^a$. A conveyor-screw 2 is mounted in the tank and is adapted to convey upwardly, through said cylindrical section $1'$, all solid extracted material fed at the bottom through the opening $1^a$. Such solid material at the end of the conveyor-screw 2 is forced still further upwardly into an initial packing and steaming section $1^b$ positioned directly above the conveyor-screw 2 and which is free of conveying mechanism or conveyor-screw flights so that said conveyor-screw may be considered as the bottom of said section and the material conveyed by the screw 2 may be lightly packed therein against the gravity of such material. The walls of the section $1^b$ preferably diverge outwardly at a small pitch to provide a packing and steaming section of inverted frustro-conic configuration so as to compensate for the increased path that the treating steam fed in at the lower end of such divergent section is compelled to follow. Said initial packing and steaming section $1^b$ has communicating therewith a series, and, as shown, five steam nozzles 6. These nozzles have portions which pass through the wall of the section and have their outlet ends bent preferably upwardly while their inlet ends are connected to a steam manifold 7 so that the nozzles 6, within the section $1^b$, are adapted to blow steam directly into said section which steam thereafter will, owing to the fact that the body of the material in the cylindrical section $1^b$ and in the feed conduit 4 adjacent to the feed inlet $1^a$ prevents any backward movement, move upwardly through the section with the upwardly-moving solid material but at a higher rate of speed.

The section $1^b$ communicates, at its upper end, with another similar packing and steaming section $1^c$ which is separated from the section $1^b$ by a screw flight $2'$. The section $1^c$ also diverges continuously outwardly at the same pitch as section $1^b$ and comprises a free chamber between screw flight $2'$ and another screw flight $2^a$ which form its bottom and top respectively.

In the embodiment shown, the steaming and packing section $1^c$ communicates through the screw-flight $2^a$ with still another frustro-conic packing and steaming section $1^d$ similarly formed between said screw flight 2ª and a screw flight 2ᵇ at a higher level, and the section 1ᵈ similarly communicates through the screw flight 2ᵇ with another packing and steaming section 1ᵉ which communicates through a screw flight 2ᶜ with a quieting section 1ᶠ which, when filled with material, serves to prevent the steam admitted to the packing and steaming sections from blowing solid material into a vapor chamber 8 at the top of the apparatus.

All of the packing and steaming sections comprise inverted frustro-conic chambers positioned between interrupted flights 2', 2ª, 2ᵇ and 2ᶜ respectively on the conveyor screwshaft 3. As illustrated, the conveyor-screw 2 and said interrupted flights are mounted on the shaft 3 supported in vertical position and mounted at its lower end in bearings 3ª and passing near said lower end through a suitable stuffing box 3'. The section 1ᶜ is similarly provided with a series of nozzles 6', the section 1ᵈ is provided with a series of nozzles 6ª and the section 1ᵉ is provided with a series of nozzles 6ᵇ connected respectively with steam manifolds 7', 7ª and 7ᵇ.

The inverted frustro-conic section 1ᶠ forms the upper end section of the continuous inverted frustro-conic part of the tank, and said upper end opens into the vapor-collecting section 8 of the tank, so that solid material forced through said frustro-conic sections is unconfined at its upper end and freely overflows the edge of said section 1ᶠ. Said section 1ᶠ is as shown free of steaming nozzles and at its upper end is connected with a cylindrical vapor section 8 closed at its upper end by a flat top plate 8' and having a lower-end portion of greater diameter and provided with a discharge channel 9 into which the material is forced or deflected from the section 1ᶠ by scraper arms 11' and through which channel the material is moved to a connected outlet chute 10 by paddles 11 on said scraper arms 11'. The arms 11' are mounted on a collar 12 fixed to the upper end of the shaft 3 which passes axially through the tank and section 8 and extends above the top 8' of said vapor section. A plurality of scraper arms 13 scrape the bottom of the plate 8' to free same from films of condensed vapor and dust from the solid material. Said scraper arms are mounted on collar 13' and also attached to and rotated by the shaft 3 which, adjacent to its upper end, passes through the stuffing box 3' and, at its upper end, is mounted in bearings 3ᶜ supported by web arms 14.

The vertical shaft 3 is, as shown, rotated at suitable speed from the horizontal shaft 17 through a pinion 15 fast on said shaft 3 and meshing with a pinion 16 mounted on the shaft 17 which is supported in bearings 18, 18' on top of the web members 14 and which shaft 17 may be driven through the sprocket gear 19 from any suitable source of power not shown. The cylindrical section 1' has a door 20 and the sections above the first section are also provided with additional doors 20', 20ª and 20ᵇ. Such additional doors may, if desired, be employed to discharge material and thus to limit the steam treatment of such material to that part of the apparatus below the door selected for such discharge. If desired, a suitable plow or rotary arm 24 and chute 21 shown in dotted lines at the left hand side of Fig. 5 may be used in cooperation with such door-openings.

In operation, material, as shown, is fed through a conduit 4 into the tank 1 through opening 1ª into contact with the lower flights of the screw 2. The conduit 4 has a conveyor-screw 5 and feeds the material from any suitable source, not shown, but conventionally such material is first passed through an indirect drier or like apparatus in which the temperature thereof is raised to a point which will avoid excessive condensation of directly-applied steam, and then such heated material is fed to the direct steam-treating apparatus shown. It will be understood however, that treatment in an indirect dryer may be eliminated if the temperature of the material coming from an extraction unit is high enough to prevent such excessive condensation. The conveyor-screw 5 and the cylindrical portion of the tank 1 constitutes a conveyor and the body of material fed thereto at its lower end is forced upwardly through said cylindrical section 1' and when filled, the material therein forms a steam-pressure resistant bed. The material then passes into the outwardly-divergent or inverted frustro-conic section 1ᵇ within which section such material is initially loosely packed by the action of the screw 5 preferably acting only against gravity or the weight of the material handled in said packing section. The capacity of this section is, as aforesaid, increased over the cylindrical section and the compactness of this initial gravity packing is slightly relieved by the upward divergence of the walls of said section 1ᵇ. The steam employed may be wet or superheated according to the requirements of the material being treated and such steam is so blown under pressure through such nozzles into such initially packed material in a series of outwardly-divergent jets which completely spread through all parts of the said loosely packed material and such steam being prevented from moving downwardly because of said pressure-resistant bed in the cylindrical section 1' and with or without the cooperation of a compressed portion of material adjacent to the inlet, move upwardly with the material but will move at a higher rate of speed than the controlled speed of such material. The steam so forced under pressure into the material will, because of the gravity packing of the material in the treating sections, be maintained under some pressure while passing through such material.

When the material thus treated reaches the first interrupted rotating screw flight 2' it is again conveyed and forced upwardly against the weight of the body of material into the section 1ᶜ where such material is again subjected to the action of a battery or series of jets of steam blown through nozzles 6' at a higher level. In this instance the steam may be superheated and blown at a higher degree of heat than the steam jets passing through the lower nozzles 6. In this section 1ᶜ also the steam will move with the material but will rise through such material because it will move under pressure through the tank at a faster rate of speed, and because of the packing of the material in this section the steam will be retained therein under some pressure. The condensing temperature of the steam within the tank will, therefore, be higher than if such steam were expanded at atmospheric pressure, and a very high velocity of the steam through the apparatus may be attained and a very much higher degree of heat transfer between the steam and material will thus be obtainable than would be possible, for example, with a material in unpacked or loose condition.

Each of the sections is, in the preferred form of my invention, provided with openings closed by thimbles 22 so that a thermometer may be inserted at any given level to procure temperatures and to permit samples to be taken to test moisture conditions of the material. In the event that tests show that material has, for example, in only two sections reached the necessary requirements for that specific material, it may be unloaded or discharged through one or another of the doors in the apparatus. If, on the other hand, the temperature or other requirements of the material are greater than can be obtained in the first two sections, such material may then be passed through the remaining sections 1d and 1e and in these sections again treated with steam of proper quality. In any event, the tank will, of course, be provided, at its upper end with a vapor section having a vapor outlet conduit 23 leading to a suitable condenser in which the steam vapor and any solvent vapor entrained and carried thereby may be condensed and separated.

In Fig. 6 I have shown a construction which is, in all respects, similar to that shown in Figs. 1 to 5 except that instead of inverted frustro-conic sections shown in Figs. 1 to 5, cylindrical steam treating sections are utilized in cooperation with conveyor flights of progressively increasing pitch so that the capacity of such flights will be increased progressively and the degree of packing will successively be relieved in the chambers 1b', 1c', 1d' and 1f' to increased extents as the material rises through the tank. In this way, I am enabled to compensate for the increased path that the treating steam fed in at the lower end of such divergent section is compelled to follow.

In a typical example, one sample of material comprising distiller's grain was first passed through an indirect heater and then subjected to direct steam treatment in my apparatus. At the feed aperture 1a of the tank 1, this material registered 196° F., and a moisture content of 9.4%. This sample having a temperature of 230° and a moisture content of 9.9%, was discharged through the door 20a after having been treated with wet and superheated steam at different levels. The temperature of the superheated steam was 240° F. and its quantity very near to the theoretical quantity required. The apparatus was running at full capacity of 5,000 pounds per hour. The zone where the material was subjected to the blowing of steam was 3 feet in height, and the speed of the material through the zone was 1 foot per minute. Consequently, the material was subjected to the steaming for a length of 3 minutes only.

With another similar sample, the temperature at the feed aperture 1a was 197° F., with a moisture content of 10.4%. This sample after treatment was similarly discharged through door 20a with a temperature of 232 and a moisture content of 11.6%.

The efficiency of the apparatus will, in view of the above examples, be seen to be very high and confirms applicant's theory that in the steaming and packing sections, the steam will still be under pressure due to the loose packing thereof and because of this fact, the condensing temperature will be higher than is the case where steam is condensated without such loose packing of material, and that in applicant's apparatus, the degree of heat transfer is greatly increased by the high velocity of steam that is obtainable through the material.

Another factor which may, in part, account for the high increase in efficiency over prior art apparatus is that in applicant's device the steam moves with the material, though at a faster rate of speed, and the steam particles will, therefore, be retained in contact with the material particles for a slightly longer time period than if the steam were moving in counter-current, but as the steam moves at a faster rate, as aforesaid, it will not only transfer heat and some moisture but will entrain and remove any solvent particles contained in the material.

Having described my invention, I claim:

1. Apparatus for direct-steam treatment of solvent-extracted solid material embodying, in combination, an upwardly-extending tank having a material feed-opening at its lower portion and, at its upper portion, being provided with a material discharge-opening and a vapor outlet, a steam-treating section disposed between the ends of said tank and within which material is adapted to be loosely packed, means for blowing steam into said steam-treating section, a stem-resisting section positioned between said steam-treating section and said feed opening and adapted, in filled condition, to resist the downward movement therethrough of steam blown into said steam-treating section, and conveyor means having flights extending upwardly through said steam-resisting section, said flights being interrupted at the steam-treating section, whereby a column of solid material will be moved through said tank in an upward direction and a section thereof loosely-packed within said steam-treating section, and a current of steam will be simultaneously passed in the same direction through such loosely-packed material.

2. Apparatus for direct-steam treatment of solvent-extracted solid material embodying, in combination, an upwardly-extending tank having a material feed-opening at its lower portion and, at its upper portion, being provided with a material discharge-opening and a vapor outlet, a steam-treating section disposed between the ends of said tank and within which material is adapted to be loosely packed, means for blowing steam into said steam-treating section, a steam-resisting section positioned between said steam-treating section and said feed opening and adapted, in filled condition, to resist the downward movement therethrough of steam blown into said steam-treating section, said steam-treating section having a width increased over the width of the steam-resisting section to provide increased capacity in said treating section, and conveyor means having flights extending upwardy through said steam-resisting section, said flights being interrupted at the steam-treating section, whereby a column of solid material will be moved through said tank in an upward direction and a section thereof loosely-packed within said steam-treating section, and a current of steam will be simultaneously passed in the same direction through such loosely-packed material.

3. Apparatus for direct-steam treatment of solvent-extracted solid material embodying, in combination, an upwardly-extending tank having a material feed opening at its lower portion and, at its upper portion, being provided with a material discharge-opening and a vapor outlet, a steam-treating section of inverted frustro-conic shape disposed between the ends of said tank and within which material is adapted to be loosely packed, means for blowing steam into said steam-treating section, a steam-resisting section of cylindrical configuration positioned between said steam-treating section and said feed opening and adapted, in filled condition, to resist the downward movement therethrough of steam blown into said steam-treating section, and conveyor means having flights extending upwardly through said steam-resisting section, said flights being interrupted at the steam-treating section, whereby a column of solid material will be moved through said tank in an upward direction and a section thereof loosely-packed within said steam-treating section, and a current of steam will be simultaneously passed in the same direction through such loosely-packed material.

4. Apparatus for direct-steam treatment of extracted material embodying, in combination, an upwardly-extending tank having a material feed opening at its lower portion and, at its upper portion, a material discharge-opening, a plurality of steam-treating sections of inverted frustroconic shape disposed between the ends of said tank and within which material is adapted to be loosely packed, means for blowing steam directly into said steam-treating sections, a steam-resisting section of cylindrical configuration positioned between said steam-treating section and said feed opening and adapted, in filled condition, to resist the downward movement therethrough of steam blown into said steam-treating section, a circular conveyor for conveying material to be treated upwardly through said steam-resisting section, and a plurality of conveyor members spaced from each other for successively conveying such material and to provide space between such conveyor members for loosely packing such material in said steam-treating sections.

5. Apparatus for direct-steam treatment of solvent-extracted solid material embodying, in combination, an upwardly extending tank having a material feed-opening at its lower portion and, at its upper portion, being provided with a material discharge portion and a vapor outlet, a shaft extending axially through said tank, said tank having a cylindrical lower tank section communicating with an upper outwardly-divergent material treating tank section, a conveyor-screw having flights mounted in said tank to extend through said lower tank section, said flights being interrupted in said outwardly-divergent tank section, said upper tank section being adapted to have material loosely packed therein at the interrupted flight portion of said conveyor-screw, and means for blowing steam directly into said treating section, whereby the blown steam will be expanded at a pressure above atmospheric pressure to produce an increased interchange of heat between the steam and material and the outwardly-diverging section will reduce the density to permit the steam to follow an upward path from its inlet to said outlet.

6. Apparatus for direct-steam treatment of extracted material embodying, in combination, an upwardly-extending tank having a material feed-opening at its lower portion and, at its upper portion, being provided with a material discharge-opening and a vapor outlet, said tank comprising a cylindrical lower tank portion and an outwardly-divergent upper tank portion, a shaft extending axially through said tank, a conveyor-screw mounted on said shaft within said cylindrical lower section and a plurality of linearly-spaced conveyor-screw flights on said shaft within said outwardly-diverging portion to provide in the tank above said cylindrical tank-portion and between adjacent linear conveyor-screw flights a plurality of steam-treating sections of larger capacity than said cylindrical section, means for blowing steam through said treating sections, and means for rotating said conveyor-screw and spaced flights.

7. Apparatus for direct-steam treatment of extracted material embodying, in combination, an upwardly-extending tank having a material feed-opening at its lower portion and, at its upper portion, being provided with a material discharge-opening and a vapor outlet, said tank comprising a cylindrical lower tank portion and an outwardly-divergent upper tank portion of inverted frusto-conic conformation, a shaft extending axially through said tank, a conveyor-screw mounted on said shaft within said cylindrical lower section and a plurality of linearly-spaced conveyor-screw flights on said shaft within said outwardly-diverging portion to provide in the tank above said cylindrical tank-portion and between adjacent linear conveyor-screw flights a plurality of steam-treating sections of larger capacity than said cylindrical section, means for blowing steam through said treating sections, and means for rotating said conveyor screw and spaced flights.

8. The method of direct-steam treatment of solvent-extracted solid materials, consisting in continuously moving in an upward direction through a tank a column of extracted material, loosely packing a portion of said moving column of extracted material at a given level in said tank during movement of said column therethrough, blowing steam under pressure into said loosely-packed portion, passing such steam in the same direction as the moving column, expanding such steam at the pressure of such loosely-packed portion and at the relatively high condensing temperature caused by the packing thereof.

9. The method of direct-steam treatment of solvent-extracted solid materials, consisting in continuously moving in an upward direction through a tank a column of extracted material, loosely packing a portion of said moving column of extracted material at a given level in said tank during movement of said column therethrough, blowing steam under pressure into said loosely-packed portion, passing such steam in the same direction as the moving column, expanding such steam at the pressure of such loosely-packed portion and at the relatively high condensing tempearture caused by the packing thereof, and repeating a plurality of times the steps of loosely packing, blowing steam under pressure, and moving said material upwardly within the tank.

MICHELE BONOTTO.